Aug. 8, 1939.  T. F. BAILY  2,168,312
METHOD FOR PRODUCING PHOSPHORUS
Filed April 23, 1937
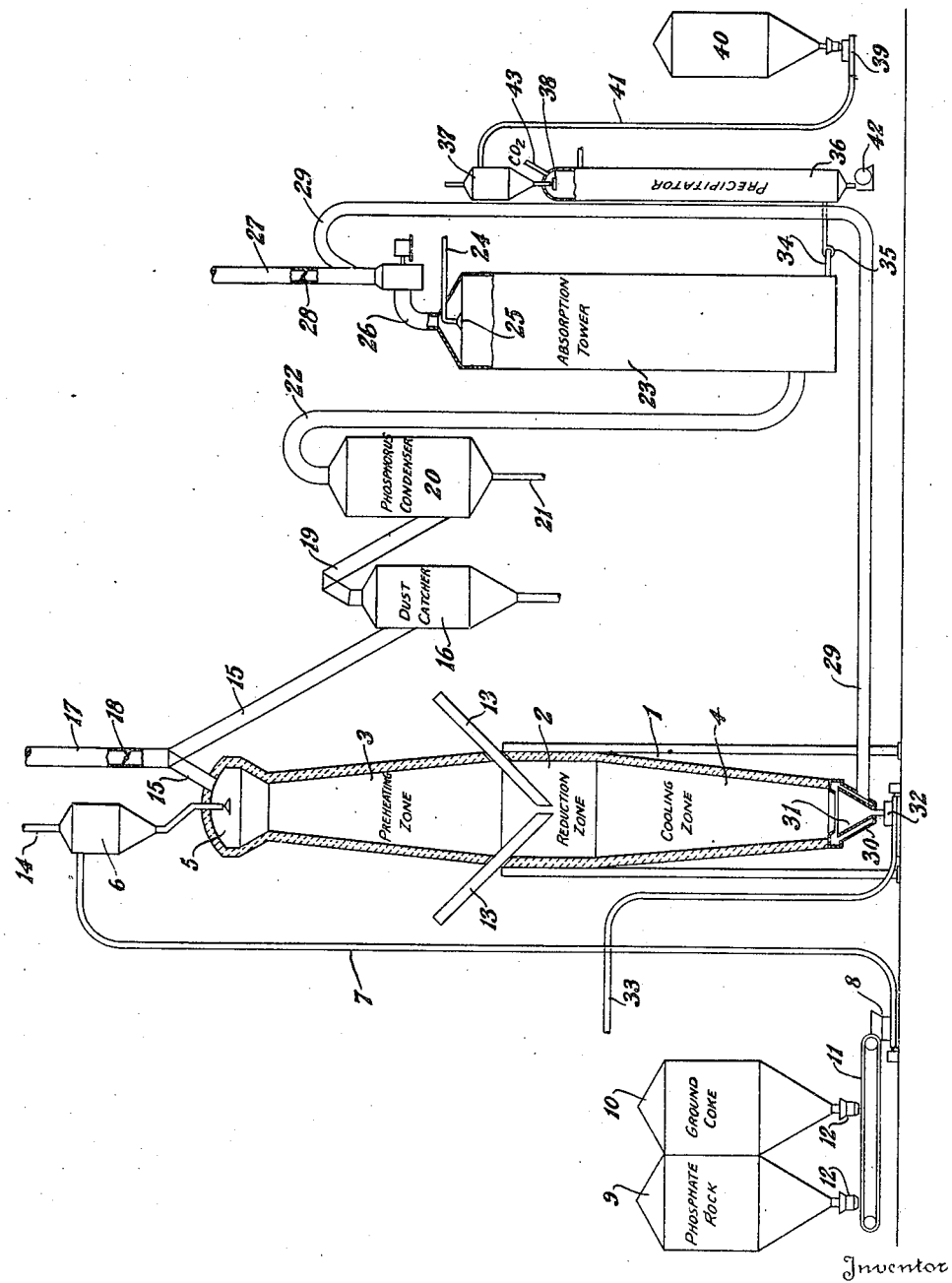
Inventor
Thaddeus F. Baily
By Frease and Bishop
Attorneys Patented Aug. 8, 1939

2,168,312

UNITED STATES PATENT OFFICE 2,168,312

METHOD FOR PRODUCING PHOSPHORUS

Thaddeus F. Baily, Alliance, Ohio

Application April 23, 1937, Serial No. 138,630

13 Claims. (Cl. 23—223)

The invention relates to the production of phosphorus or phosphoric acid from phosphate rock and the recovery of lime and other by-products from the residue of the phosphorus volatilization process. In the usual methods of producing phosphorus or phosphoric acid from phosphate rock in the electric furnace or blast furnace, lump rock is charged into the top of a closed furnace together with sand for fluxing the calcium of the rock, and the resultant slag in large volume is tapped at intervals from the hearth of the furnace. On account of the large volume and high lime content of this slag and the intimate mixture of the charge at the time of the reaction, appreciable quantities of phosphorus are held in the slag, while in my process, since the particles of rock are reacted while suspended in the gaseous reduction medium, the volatilization of the phosphorus is complete, avoiding the loss to the slag of an appreciable portion of the phosphorus, as in usual practice. This slag is a calcium silicate slag of a ratio of one to one and one-third, to one to two, and is of no particular value and therefore is usually wasted or sold for ballast.

Since practically all phosphate rock contains iron in the form of iron oxide, and since the furnace must be operated under a reducing atmosphere, this iron is reduced prior to the reduction of the phosphorus in the solid charge, and as this reduced iron is in intimate contact with the phosphorus-bearing material at the time of the reduction of the phosphorus, ferro-phosphorus of a phosphorus content up to 24% is produced, and while this product at times has a ready market, in a large scale operation it is undesirable since it reduces the yield of elemental phosphorus or phosphoric acid, which is the desired product in the production of fertilizer and certain food products.

Since practically all phosphate rock contains fluorine, either as free calcium fluorspar, $CaF_2$ or fluorapatite, $3Ca_3(PO_4)_2 \cdot CaF_2$ or both, under present practice this fluorine is wasted to the slag or volatilized and wasted with the stack gases. As fluorine-bearing gases in some forms are very injurious to the furnace lining and ducts, it is desirable to completely neutralize this fluorine to an inactive form such as $SiF_4$ and to convert this product into a valuable and usable by-product and not allow it to escape as such into the air and constitute a menace to health.

In the new process and apparatus to which the present invention pertains I make use of the free falling principle wherein the materials of the charge are finely ground and charged into the top of a shaft type furnace which may be similar to the one disclosed in my copending application for Method of and apparatus for calcination of phosphate-bearing materials, Serial No. 11,673, but since the furnace must be operated and maintained under a reducing atmosphere in order to reduce the phosphorus in the charge, I use electricity for heating, and locate the electrodes in the middle section of the furnace shaft which is therefore the highest temperature zone, where the phosphorus is reduced and volatilized and carried up to the top of the furnace shaft to a gas exit along with CO and $SiF_4$ and thence to a phosphorus condenser where the $P_2$ is liquefied and recovered from the gas and may then be burned in a separate chamber to $P_2O_5$ or $H_3PO_4$ and collected in the usual manner.

In the drawing the figure is a diagrammatic sectional elevation of a shaft type electric furnace and associated apparatus in which the process may be carried out.

Similar numerals refer to similar parts throughout the drawing.

The shaft furnace is indicated generally at 1 and is preferably of the shape shown in the drawing, in which the reduction zone 2 at the middle portion of the shaft is of larger diameter than the remaining portions of the shaft which may be tapered upwardly through the preheating zone 3 and downwardly through the cooling zone 4.

A suitable feeding head 5 may be provided at the upper end of the furnace for feeding the finely ground material of the charge, namely coke and phosphate rock, from the superimposed hopper 6 which is supplied with the finely ground material in proper proportions through the pipe 7 leading from the transport pump 8, which receives the ground phosphate rock or flotation concentrates and the ground coke from the bins 9 and 10 respectively, by means of the conveyor 11, these bins being provided with constant weight feeders 12 for delivering the desired amounts of the materials of the charge to the conveyor.

Electrodes 13 are located in the reduction zone of the furnace to produce an open arc for supplying electric heat for the reaction. A vent 14 may be provided in the top of the hopper 6 and the top of the furnace is closed excepting for the offtake pipe 15 which may lead to a dust catcher 16 and may be provided with a branch pipe 17 having a relief valve 18 therein.

A pipe 19 leads from the top of the dust catcher to the lower portion of a phosphorus condenser

20 having a discharge pipe 21 at its lower end from which liquid $P_2$ may be withdrawn. The remaining gases may be withdrawn from the top of the phosphorus condenser through the duct 22 and delivered to the lower portion of an absorption tower 23, into the upper portion of which cold water may be admitted through the pipe 24 and spray head 25.

The gases are withdrawn from the top of the absorption tower through a duct 26 connected to a waste pipe 27 having a damper 28 therein, a pipe 29 being connected to the pipe 27 below the damper and leading to the lower portion of the furnace for returning CO gas thereto within the inverted conical jacket 30, the upper end of which opens into the shaft of the furnace. The conical hearth 31 within this jacket is adapted to receive the CaO and Fe from the reaction, which may be discharged through the bottom thereof into a transport pump 32 and conveyed through a pipe 33 to a magnetic separator for separating the iron from the lime and thence to a lime storage bin.

The lower end of the absorption tower may be connected as by a duct 34 having a fan 35 therein, with the lower end of a precipitator 36, above which is mounted a hopper 37 provided with a feeding head 38 in the upper portion of the precipitator, and adapted to be supplied with fine $CaCO_3$ as by the transport pump 39 communicating with a bin 40 and provided with a pipe 41 leading to the hopper 37. The lower end of the precipitator 36 may communicate with a filter 42.

In carrying out the process, the finely ground phosphate rock and coke in sufficient proportion to completely reduce all of the phosphorus are charged into the feeder head 5. As this finely divided material of the charge descends toward the middle portion of the furnace shaft, it is preheated substantially to reaction temperature by the upcoming reducing gases consisting mainly of CO.

When the preheated charge of finely divided phosphate rock and carbon reaches the middle zone of the furnace, the temperature is raised by electric heat supplied through the electrodes 13 to a temperature above 1400° C., under which conditions a rapid reaction takes place between the fine phosphate rock and the fine carbon in the presence of substantially a complete CO atmosphere, the phosphorus of the rock being reduced and volatilized so that it ascends through the furnace shaft with the CO gases, while the remainder of the charge, consisting of the solid products CaO, $SiO_2$, $Al_2O_3$, Fe, etc., descends from the electrically heated reduction zone to the hearth 31 where they are cooled by the recirculated CO gas introduced through the duct 29, which not only cools the solid particles but recovers the heat therefrom, said heat being used in the upper portion of the furnace for preheating the charge.

The upgoing gases from the electrically heated reduction zone consisting largely of CO from the recirculating gases and from the reaction between the phosphate rock and carbon, elemental phosphorus in the vaporous form, and fluorine gas in the form of HF, or if silica is present, as $SiF_4$, after they have given up a portion of their heat in preheating the incoming charge in the upper part of the furnace shaft, are removed through the duct 15 at a temperature above the volatilization point of phosphorus, and are conducted through the dust catcher to the phosphorus condenser 20 where the vapors are sufficiently cooled to condense the phosphorus.

The liquid $P_2$ may be withdrawn through the discharge pipe 21 in the lower portion of the phosphorus condenser while the remaining gases as $SiF_4$ and CO are conducted through the duct 22 to the absorption tower where the fluorine is removed from the gases, preferably in the form of $H_2SiF_6$ and discharged through the duct 34 into the precipitator 36, and the remaining gases, consisting substantially of CO, are removed from the top of the absorption tower through the duct 29 and conducted to the junction pipe 27 where a sufficient portion of the gas is recirculated through the hearth of the furnace by means of the duct 29, the excess gas over that required for recirculation being exhausted through the waste pipe 27 or used in any desired manner.

The $SiF_4$ of the gas when converted into $H_2SiF_6$ in the absorption tower is pumped into the precipitator 36 into which fine limestone is charged from the hopper 37, and the $H_2SiF_6$ is converted into $H_2SiO_3$ and $CaF_2$, the $CO_2$ from the reaction being discharged from the precipitator as waste, or may be conveyed through the duct 43 for any desired purpose.

Since it is not necessary under the improved process to produce a fluid slag in order to remove the residue from the reduction operation, from the furnace, and since I recirculate a reducing gas to cool the residue before it comes to rest in the lower portion of the furnace, I recover, instead of a valueless fluid slag, nearly one and one-half tons of high grade lime as a by-product, and since the iron of the charge is reduced out of physical contact with the particles of phosphate rock, this iron passes down with the lime residue in a finely divided condition and is cooled in a reducing atmosphere, thus preventing oxidation.

The entire residue when cool and withdrawn from the furnace as through the duct 33, may be passed over a magnetic separator which removes the iron residue as sponge iron, making in itself a valuable by-product as well as increasing the purity of the lime residue.

It is to be noted that in my process it will be desirable to use a phosphate rock of low silica content if it is desired to produce a lime of high quality, while under present practice a high silica content of the charge is desirable, since silica to flux the lime must be present. High grade phosphate rock with low silica content is more easily attained at present than the lump rock required for the usual phosphorus process due to the large production of flotation concentrates and since this latter product is of necessity in its production finely divided, it makes an ideal charge for my new process.

In comparing the usual phosphorus reducing furnace and process with my new furnace and process, it is to be noted that the usual process requires lump rock, lump coke, and coarse sand or gravel, and produces volatile phosphorus, ferro-phosphorus and a fluid slag of no commercial value, while with my new furnace and process all of the phosphorus of the charge is recovered as elemental phosphorus or phosphoric acid and I produce and recover substantially pure sponge iron and high grade lime as by-products instead of ferro-phosphorus and a waste slag at the bottom of the furnace, and that I recover the fluorine from the gas and make from it a valuable by-product and then have left substantially pure CO gas, a portion of which is recirculated through the furnace to maintain a reducing atmosphere and at the same time act as a recuperative medium for conserving heat, resulting in the saving of power required, and for rapidly cooling the calcium residue of the reaction.

The usual reaction in an electric furnace is as follows:

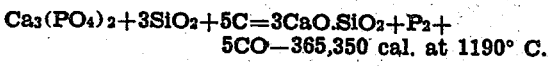

or

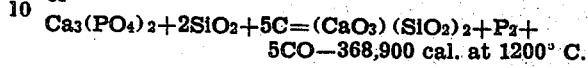

while in my process the reaction is

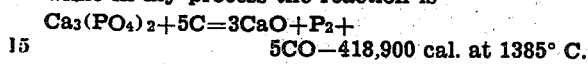

I have found that a temperature of above 1400° C. is necessary to completely remove the fluorine held within the rock as $3Ca_3(PO_4)_2.CaF_2$, so that I make use of the higher temperature required in the phosphorus reduction to completely remove the fluorine which is removed as a fluorine gas which combines with the silica always present in the phosphate rock, forming $SiF_4$ or any similar silicon fluorine compound, while in the present practice, due to the lower temperature at which the reaction takes place, only a portion of the fluorine is removed and carried out with the gases, the remainder being held in the slag where it cannot be readily recovered as a by-product.

The charge and products of the present practice and of my new process are as follows per ton of $P_2O_5$ volatilized:

| Old process | New process |
| --- | --- |
| 3 tons 72% lump rock. | 2⅔ tons 77% flotation concentrate. |
| 1 ton sand or gravel. | No sand. |
| 1,300 lbs. coke breeze. | 1,200 lbs. fine coke. |
| 5,900 k. w. h. | 4,600 k. w. h. |
|  | 3,000 lbs. recirculated CO gas. |

| Products | |
| --- | --- |
| 1 ton $P_2O_5$ as $P_2$. | 1 ton $P_2O_5$ as $P_2$. |
| 3 tons slag waste. | 3,000 lbs. fine lime 92% $CaC_2$. |
| ⅒ ton ferro-phosphorus. | 100 lbs. sponge iron. |

It will be seen that the advantages of my new process over existing processes consists not only in handling of fine dry materials instead of slag but in a saving of one ton of sand per ton of phosphoric acid produced and the recovering of lime as a valuable by-product, and a saving of nearly one-fourth in power required for the present process, as well as the recovery of the fluorine as a useful, valuable by-product instead of allowing it to pollute the atmosphere and constitute a menace to health.

I claim:

1. The process for treatment of phosphate rock for the recovery of phosphorus, which comprises charging finely divided phosphate rock, and a sufficient amount of finely divided carbon to reduce all of the phosphorus in the rock, into the upper portion of a vertical chamber, permitting the finely divided phosphate rock and carbon to freely fall through the chamber, heating the charge in the middle portion of the chamber by subjecting the freely falling particles of the charge to the heat of an open electric arc to reduce and volatilize the phosphorus while the charge is in suspension, and removing the phosphorus-bearing gases of the reaction at a temperature above the volatilization point at the upper portion of the chamber.

2. The process for treatment of phosphate rock for the recovery of phosphorus, which comprises charging finely divided phosphate rock, and a sufficient amount of finely divided carbon to reduce all of the phosphorus in the rock, into the upper portion of a vertical chamber, permitting the finely divided phosphate rock and carbon to freely fall through the chamber, heating the charge in the middle portion of the chamber by subjecting the freely falling particles of the charge to the heat of an open electric arc to reduce and volatilize the phosphorus while the charge is in suspension, removing the phosphorus-bearing gases of the reaction at a temperature above the volatilization point at the upper portion of the chamber, and cooling and collecting the calcium iron residue in a finely divided form at the lower portion of the chamber.

3. The process for treatment of phosphate rock for the recovery of phosphorus, which comprises charging finely divided phosphate rock, and a sufficient amount of finely divided carbon to reduce all of the phosphorus in the rock, into the upper portion of a vertical chamber, permitting the finely divided phosphate rock and carbon to freely fall through the chamber, electrically heating the charge in the middle portion of the chamber by an open arc to reduce and volatilize the phosphorus while the charge is in suspension, and removing the phosphorus-bearing gases of the reaction at a temperature above the volatilization point at the upper portion of the chamber.

4. The process for treatment of phosphate rock for the recovery of phosphorus, which comprises charging finely divided phosphate rock, and a sufficient amount of finely divided carbon to reduce all of the phosphorus in the rock, into the upper portion of a vertical chamber having a reducing atmosphere, permitting the finely divided phosphate rock and carbon to freely fall through the chamber, heating the charge in the middle portion of the chamber by subjecting the freely falling particles of the charge to the heat of an open electric arc to reduce and volatilize the phosphorus while the charge is in suspension, and removing the phosphorus-bearing gases of the reaction at a temperature above the volatilization point at the upper portion of the chamber.

5. The method of recovering phosphorus from phosphate rock which comprises subjecting freely falling particles of said phosphate rock and a sufficient amount of freely falling particles of carbon by means of an open electric arc to a temperature sufficient to effect completion of the phosphorus reducing reaction while the particles are in suspension, removing the phosphorus from the gases of the reaction, and cooling and recirculating a portion of the CO upward through the descending residue from the phosphorus freeing reaction to cool the same.

6. The process for treatment of phosphate rock for the recovery of phosphorus, which comprises charging finely divided phosphate rock, and a sufficient amount of finely divided carbon to reduce all of the phosphorus in the rock, into the upper portion of a vertical chamber, permitting the finely divided phosphate rock and carbon to freely fall through the chamber, heating the charge in the middle portion of the chamber by means of an open electric arc to reduce and volatilize the phosphorus while the charge is in suspension, removing the phosphorus-bearing gases of the reaction at a temperature above the volatilization point at the upper portion of the chamber, removing the phosphorus from the gases of the reaction, and cooling and recirculating a portion of the CO upward through the residue from the phosphorus freeing reaction to cool the same.

7. The method of recovering phosphorus from phosphate rock which comprises subjecting freely falling particles of phosphate rock and carbon to the heat of an open electric arc at temperatures and under conditions which effect reduction and volatilization of the phosphorus while the particles are in suspension.

8. The method of recovering phosphorus from phosphate rock which comprises subjecting freely falling particles of phosphate rock and carbon to the heat of an open electric arc at temperatures and under conditions which effect reduction and volatilization of the phosphorus while the particles are in suspension, removing the gases above the reduction zone, condensing the phosphorus from the gases, removing the fluorine from the gases, and cooling and recirculating a portion of the phosphorus and fluorine free gases upward through the freely falling particles.

9. The method of recovering phosphorus from phosphate rock which comprises subjecting freely falling particles of phosphate rock and carbon to the heat of an open electric arc at temperatures and under conditions which effect reduction and volatilization of the phosphorus while the particles are in suspension, removing the gases above the reduction zone, condensing the phosphorus from the gases, and cooling and recirculating the phosphorus free gases upward through the freely falling residue of the phosphorus freeing reaction.

10. The process for the treatment of phosphate rock which consists in charging finely phosphate rock and carbon at the top of a shaft furnace and allowing the charge to fall freely through the furnace in counterflow to a current of heated gases which ascend through the furnace, reducing the phosphorus oxide to elemental phosphorus at the middle portion of the furnace with electric heat from an open electric arc while in suspension, collecting the calcium residue at the bottom of the furnace and removing the gases containing elemental phosphorus at the top of the furnace.

11. The method of recovering phosphorus from phosphate rock which comprises subjecting freely falling particles of phosphate rock and carbon to a temperature sufficient to effect the completion of the phosphorus reduction reaction while the particles are in suspension, supplying the necessary heat by an open electric arc at an intermediate point in the fall of the particles and cooling the residue from the reaction below the reaction zone by recirculating non-oxidizing gases upward through the falling particles.

12. The process for treatment of phosphate rock which comprises charging finely divided phosphate rock carbon at the top of a shaft furnace, allowing the charge to fall freely through the furnace counterflow to a current of heated reducing gases, reducing the phosphorus oxide to elemental phosphorus in the middle portion of the furnace with an open electric arc while the charge is in suspension, cooling the residue from the reaction in the lower portion of the furnace by recirculating a portion of the cooled reducing gases through the lower portion of the furnace, removing the cooled residue at the bottom of the furnace and removing the gases containing elemental phosphorus at the top of the furnace.

13. The process for treatment of phosphate rock which consists in charging into the top of a shaft furnace finely divided phosphate rock and carbon in sufficient quantity to reduce all of the phosphorus oxide in the rock to elemental phosphorus, allowing the charge to fall freely through the furnace counterflow to a current of heated reducing gases, supplying the necessary heat at the middle portion of the furnace by an open electric arc, cooling the residue below a sintering temperature while freely falling through the lower portion of the furnace, removing the gases containing elemental phosphorus at the top of the furnace and removing the residue at the bottom of the furnace.

THADDEUS F. BAILY.